(12) United States Patent
Junker et al.

(10) Patent No.: US 11,708,903 B1
(45) Date of Patent: Jul. 25, 2023

(54) PARK SYSTEM INTEGRATION WITH CHAIN DRIVE

(71) Applicant: BorgWarner, Inc., Auburn Hills, MI (US)

(72) Inventors: Matthew E Junker, Ray, MI (US); Joseph P. Goodsell, Groton, NY (US)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 18/048,239

(22) Filed: Oct. 20, 2022

(51) Int. Cl.
*F16H 63/34* (2006.01)
(52) U.S. Cl.
CPC ................. *F16H 63/3433* (2013.01)
(58) Field of Classification Search
CPC .... F16H 63/3425; F16H 63/3433; F16H 7/06; F16D 2127/06; B60T 1/005
See application file for complete search history.

(56) References Cited

U.S. PATENT DOCUMENTS

| 3,704,757 | A | * | 12/1972 | Buress, III | B60T 1/005 |
| | | | | | 188/170 |
| 4,938,097 | A | * | 7/1990 | Pierce | F16H 47/085 |
| | | | | | 475/72 |
| 5,176,585 | A | | 1/1993 | Novak | |
| 5,269,195 | A | * | 12/1993 | Kitagawara | B60T 1/005 |
| | | | | | 74/577 M |
| 7,229,375 | B2 | | 6/2007 | Hummel et al. | |
| 7,972,234 | B2 | | 7/2011 | Sakamoto | |
| 10,830,324 | B2 | | 11/2020 | Younggren et al. | |
| 2007/0072719 | A1 | | 3/2007 | Sakamoto | |
| 2012/0285755 | A1 | * | 11/2012 | Keller | F16H 37/042 |
| | | | | | 475/210 |
| 2013/0040769 | A1 | * | 2/2013 | Kadokawa | F16H 63/3425 |
| | | | | | 474/8 |
| 2018/0163835 | A1 | * | 6/2018 | Janson | F16H 57/021 |

* cited by examiner

*Primary Examiner* — Lori Wu
(74) *Attorney, Agent, or Firm* — Brown & Michaels, PC (57) ABSTRACT

A parking mechanism located on a final drive or primary drive of a vehicle to engage or disengage an output shaft connected to wheels of the vehicle. The parking mechanism includes a back drive chain on the final drive or primary drive that engages with a parking pawl. A cam assembly biases the parking pawl to engage with the back drive chain to prevent rotation of the wheels.

3 Claims, 16 Drawing Sheets

PARK SYSTEM INTEGRATION WITH CHAIN DRIVE

BACKGROUND

The present invention relates to a parking system, and more specifically to a chain system on the final drive or primary drive that includes link features to be used as the parking system, replacing a traditional parking system of an internal combustion engine, an electric motor, or a combination (hybrid) solution.

Figure 1:
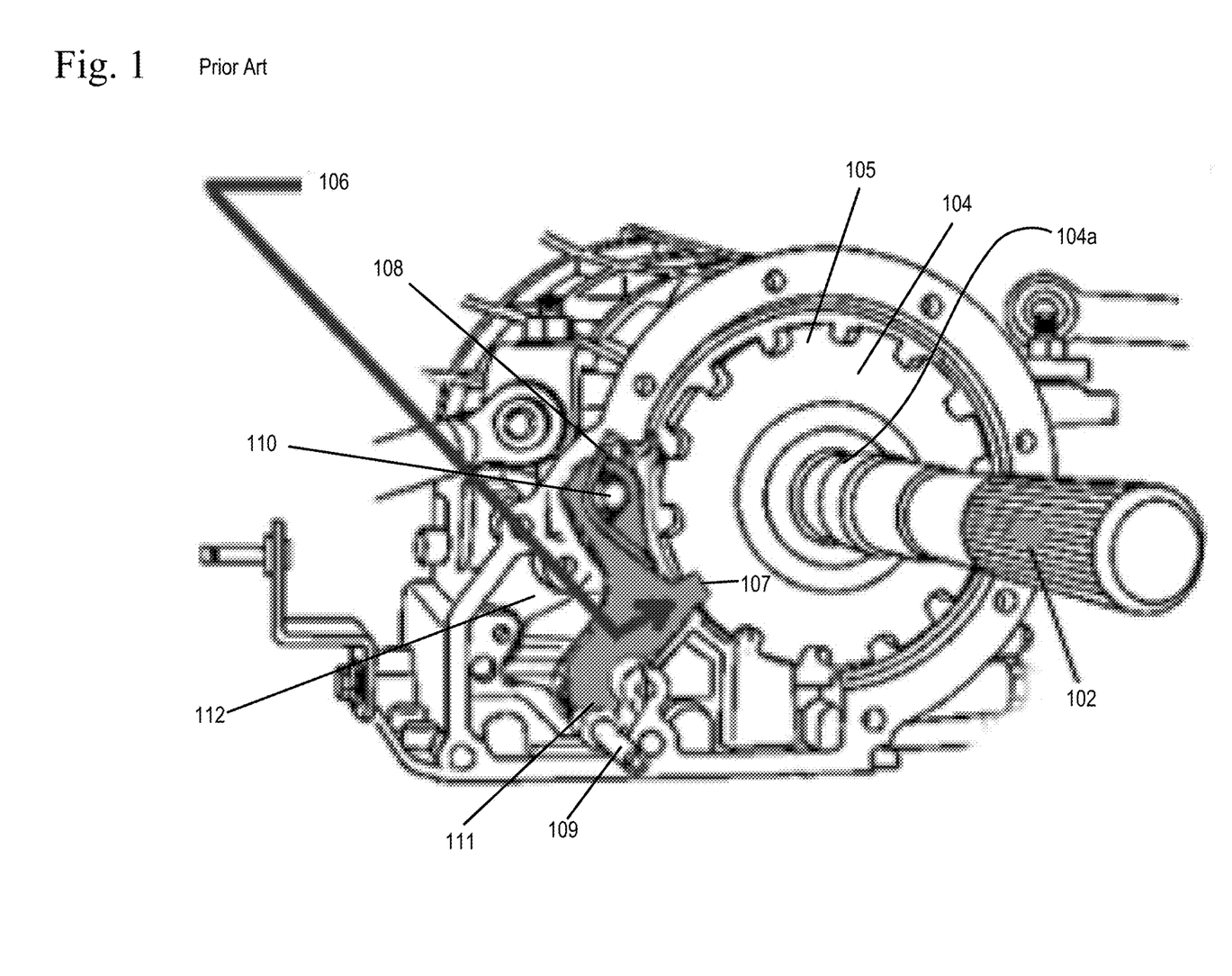
FIG. 1 shows a conventional park system in a parked position.
Figure 2:
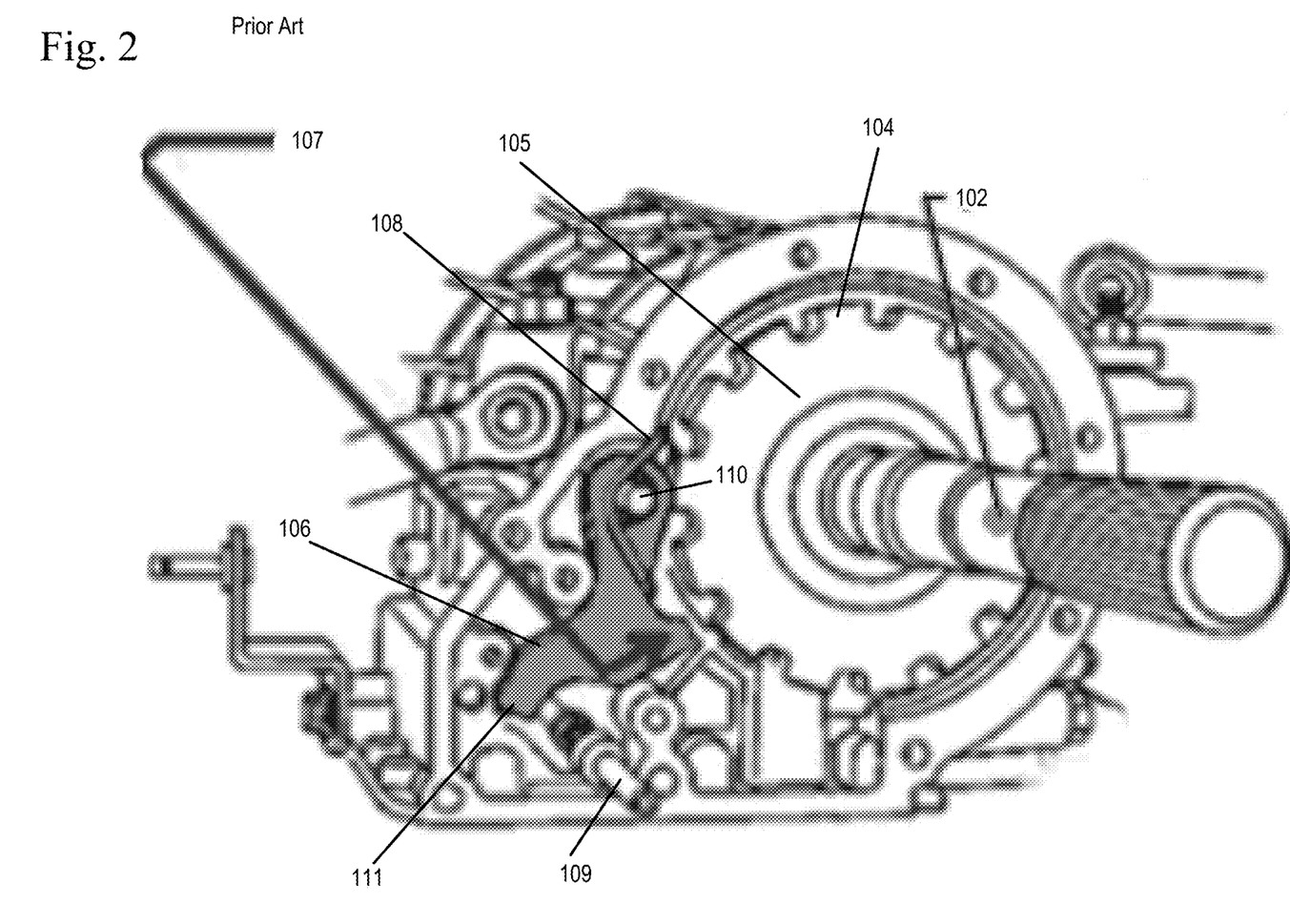
FIG. 2 shows a conventional park system in an unparked position.

In transmission applications, the park system is typically a stand alone system that includes a parking pawl and a notched parking ring on the output shaft as shown in FIGS. 1-2.

Figure 3:
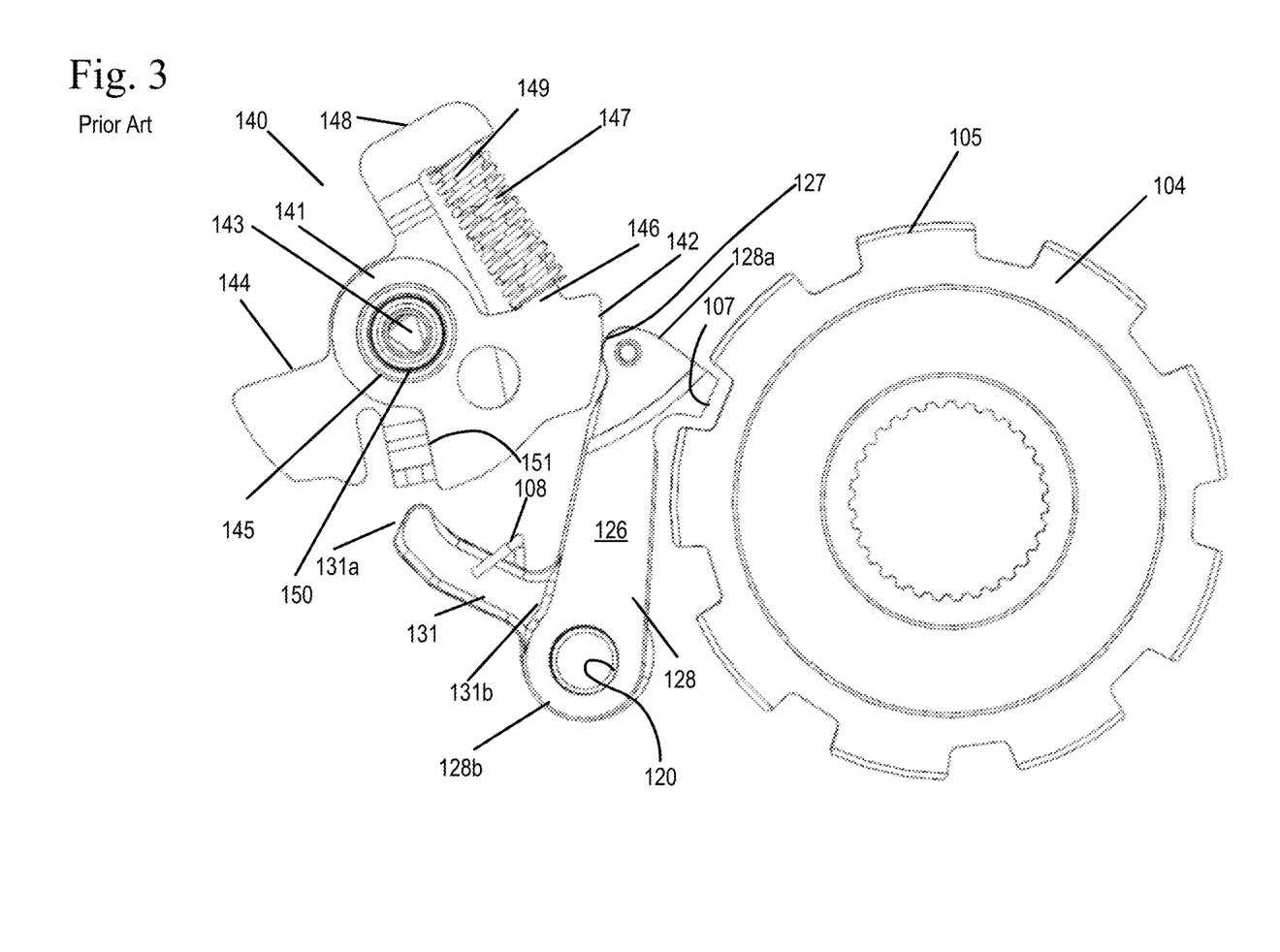
FIG. 3 shows another conventional park system.

FIGS. 1 and 3 show a conventional park system with the transmission parking pawl in an engaged, parked position. FIG. 2 shows the conventional park system with the transmission parking pawl in a disengaged position. Attached to an output shaft 102 is a metal ring 104 with a plurality of notches 105. Adjacent to, and moveable between an engaged position and a disengaged position is a transmission parking pawl 111. The transmission parking pawl 111 has a protrusion 107 which can engage with one of the notches 105 of the metal ring 104. When the transmission parking pawl 111 engages the notch 105 in the metal ring 104, the metal ring 104 is prohibited from moving and thus the output shaft 102 and drive wheels (not shown) connected to the output shaft 102 are prohibited from turning. The transmission parking pawl 111 is urged towards the parked position by a cam 112 when a vehicle is placed in park. The cam 112 urges the transmission parking pawl 111 into engagement with the notch 105 in the metal ring 104 against the bias of spring 108. When the vehicle is not in park and the cam 112 is not engaged, the spring 108 biases the transmission parking pawl 111, such that protrusion 107 does not engage with the metal ring 104 and the output shaft 102 associated drive wheels are free to turn.

FIG. 3 shows another conventional park system. In this conventional park system, the parking pawl 126 engages the metal ring 104 with a plurality of notches 105, but the parking pawl 126 is engaged by a cam assembly 140 that has a lever plate 144 that defines a center bore 150 and an arm 148 with an arm end portion 149. Located adjacent to the lever plate 144 is a cam plate 141 with a bore 145 aligned with the center bore 150 of the lever plate 144. The cam plate 141 additionally has a cam plate end portion 146 and a biasing surface 142 that contacts the parking pawl 126. Between the cam plate end portion 146 of the cam plate 141 and the arm end portion 149 of the arm 148 of the lever plate 144 is a spring 147. A pin 143 is received by the bore 150 of the lever plate 144 and the bore 145 of the cam plate 141, allowing the cam plate 141 to rotate relative to the lever plate 144.

The parking pawl 126 has a body 128 with a first end 128a and a second end 128b. The first end 126a has a protrusion 107 for engaging one of the plurality of notches 105 of the metal ring 104. Opposite the protrusion 107 is a parking pawl biasing surface 127 which is contacted by the cam plate biasing surface 142. The second end 128b of the body 128 of the parking pawl 126 defines a bore 120 in which the parking pawl 126 pivots about.

A spring plate 131 has a first end 131a and a second end 131b, with the second end 131b attached to the second end 128b of the parking pawl 126. The first end 131a can be contacted by an edge 151 of the cam plate 141. Mounted to the spring plate 131 is a spring 108 which biases the pivotable parking pawl away from engagement with a notch 105 of the metal ring 104. Spring 147 biases the cam plate 141 to bias the protrusion 107 of the parking pawl 126 into a notch 105 of the metal ring 104 to prevent the output shaft 102 associated with the drive wheels from turning.

To disengage the parking pawl 126 from a notch 105 of the metal ring 104, cam plate rotates towards the spring plate 131, such that edge 151 of the cam plate 141 engages with the first end 131a of the spring plate 131 and moves the parking pawl 126 away from and out of engagement with the notch 105 of the metal ring 104.

SUMMARY

According to one embodiment of the present invention, a parking mechanism located on a final drive or primary drive of a vehicle to engage or disengage an output shaft connected to wheels of the vehicle is disclosed. The parking mechanism comprising: a first sprocket having sprocket teeth, the first sprocket connected to the output shaft for driving the wheels of the vehicle; a second sprocket having sprocket teeth; an endless loop chain in engagement with the sprocket teeth of the first sprocket and the sprocket teeth of the second sprocket; a parking pawl pivotably moveable between an engaged position in which the parking pawl engages the laterally extending back portion of the first inside links of the endless loop chain and a disengaged position in which the parking pawl is disengaged from the laterally extending back portion of the first inside links of the endless loop chain to move the parking pawl between the engaged position and the disengaged position.

The endless loop chain has a first inside link comprising: a body having a back portion with a first flank, a second flank, and a flat surface; a pair of teeth connected by a crotch portion opposite the back portion; a pair of apertures between the pair of teeth and the back portion; wherein the back portion extends laterally from the body and is opposite at least the crotch portion, at least part of the pair of teeth and at least part of the apertures; a second inside link comprising: a body having a back portion; a pair of teeth connected by a crotch portion opposite the back portion; a pair of apertures between the pair of teeth and the back portion; and guide plates disposed on outermost sides of the endless loop chain for receiving and fixing the connecting pins. The first inside links and the second inside links are arranged in alternating interleaved rows in lateral and longitudinal directions and pivotably connected by connecting pins.

The parking pawl has a body having a first end, a second end, a top surface, and a bottom surface opposite the top surface; a plurality of alternating teeth and recesses on the bottom surface between the first end and the second end; and a roller rotatably attached to the first end of the body.

DETAILED DESCRIPTION

In a vehicle transmission, there is a need for a park mechanism to hold the vehicle firmly in place and prevent movement of the vehicle. Typically a specific gear on the transmission utilizes a square shaped gear that is engaged with an arm that engages this gear as described in the prior art above in FIGS. 1-3. In order to reduce the cost and complexity of the transmission, an embodiment of the present invention would replace the extra metal ring gear used in the transmission with a back drive chain on the final drive or primary drive that engages with the parking pawl. The final drive being on the rear axle or output shaft and connected to the rear wheels of the vehicle and the primary drive being on the front axle or output shaft and connected to the front wheels of the vehicle.

Figure 9:
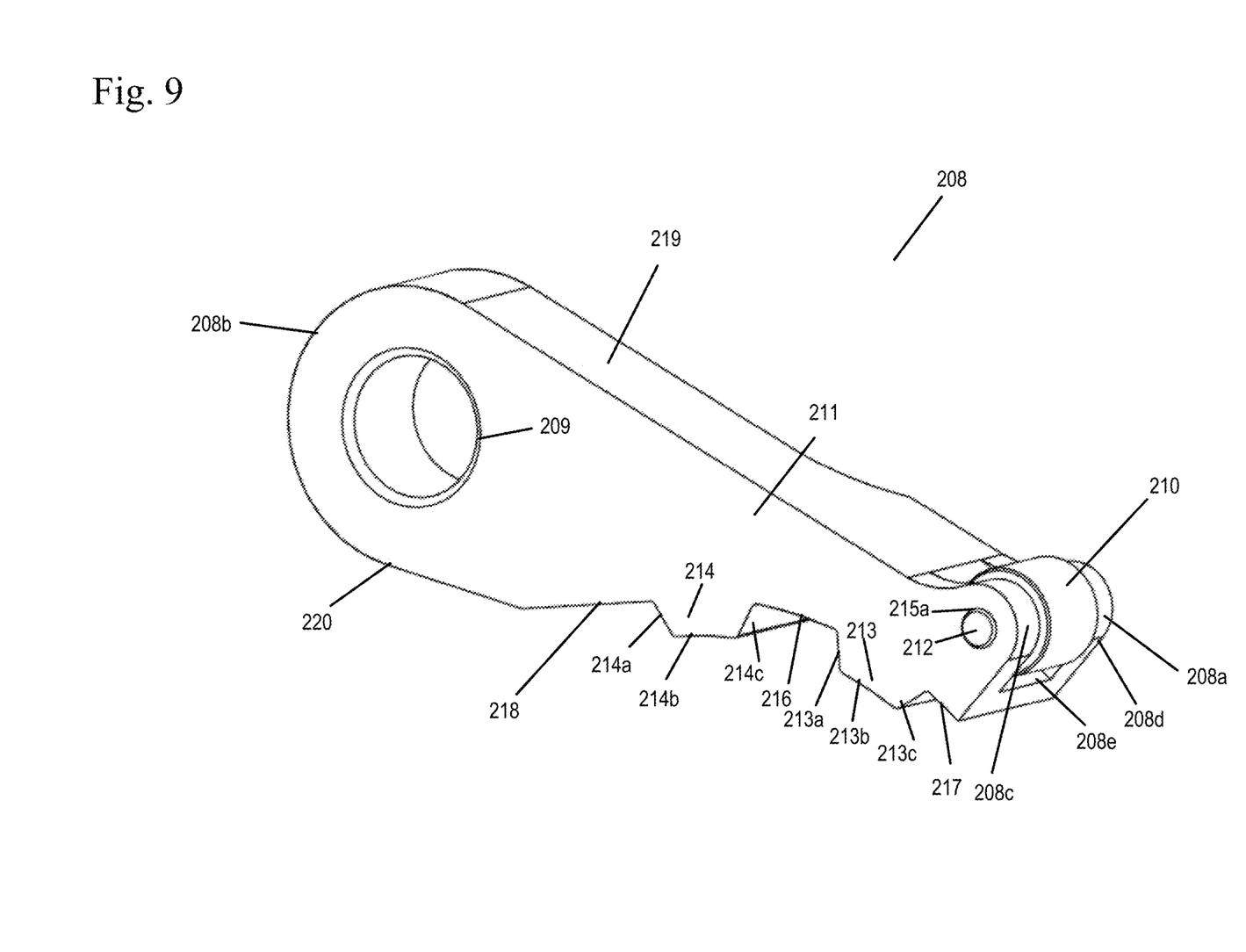
FIG. 9 shows perspective view of the parking pawl.
Figure 10:
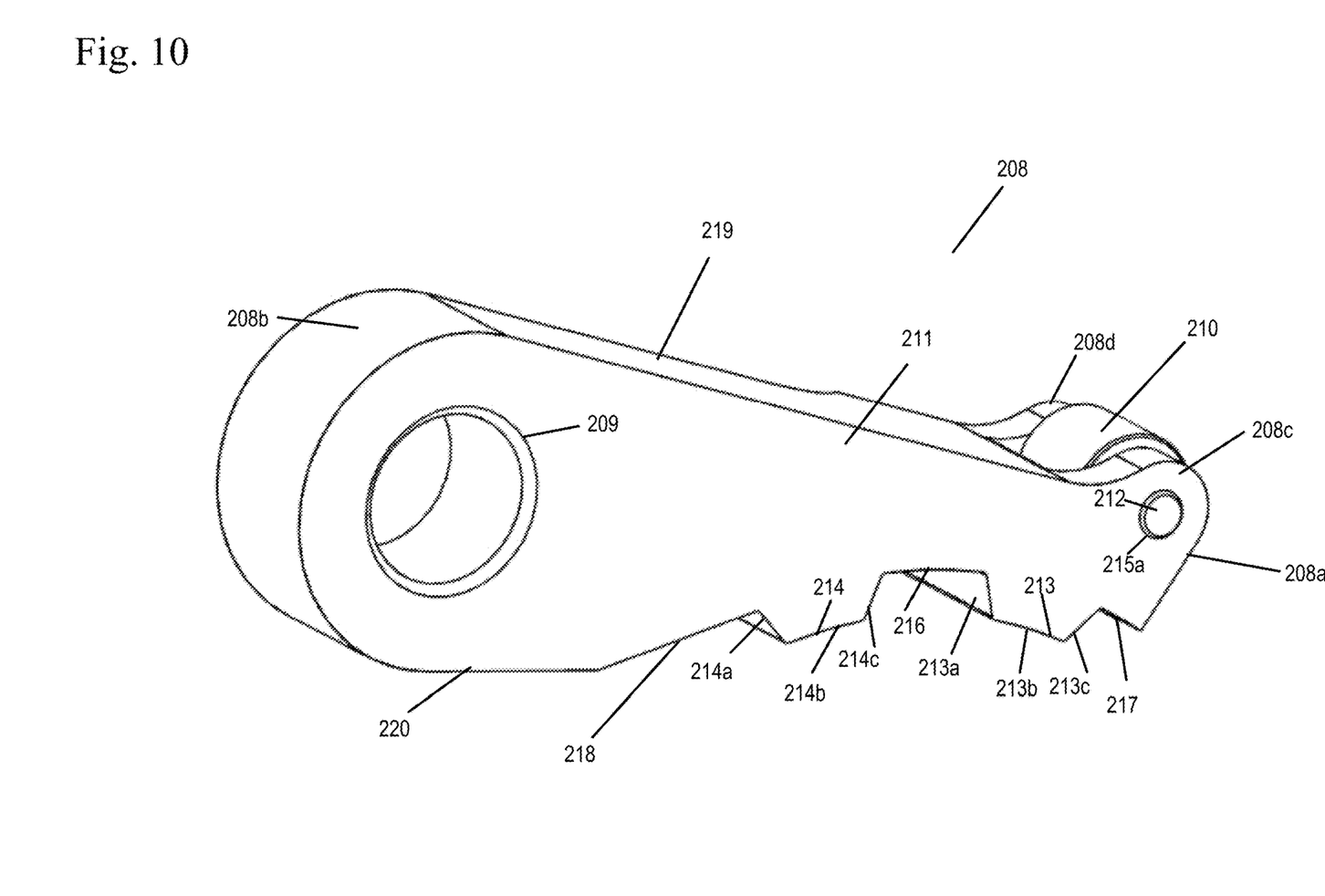
FIG. 10 shows another perspective view of the parking pawl.
Figure 11:
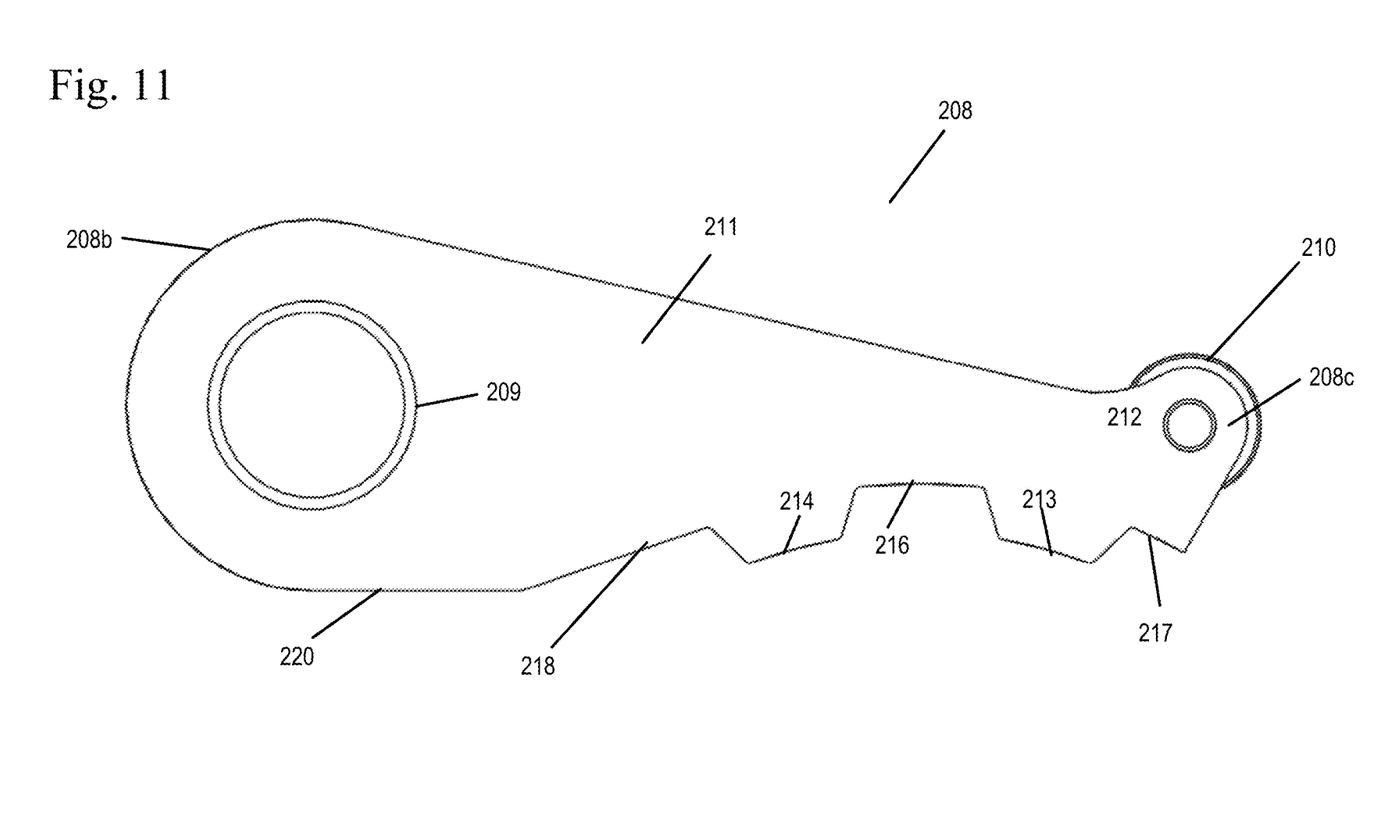
FIG. 11 shows a side view of the parking pawl.

FIGS. 9-11 show a parking pawl 208 of an embodiment of the present invention. The parking pawl 208 has a body 255 with a first end 208a, a second end 208b, a top surface 219 and a bottom surface 220.

At the second end 208b the body 255 defines a bore 209 in which the parking pawl 208 can pivot about. The bore 209 receives a pin 211. The first end 208a of the body is bifurcated into a first pawl arm wall 208c and a second pawl arm wall 208d connected by a bottom pawl wall 208e. Between the first and second pawl arm walls 208c, 208d is a roller 210 which rotates about a pin 212 with ends of the pin 212 received within bores 215a, 215b of the first and second pawl wall arms 208c, 208d.

The bottom surface 220 is comprised of a series teeth 214, 213 and recesses 218, 216, 217 which from the second end 208b to the first end 208a are: a first recess 218, a first tooth 214, a second recess 216, a second tooth 213 and a third recess 217. Each tooth 214, 213 is defined by a first flank 214a, 213a, a second flank 214c, 213c and a tooth engagement surface 214b, 213b.

Figure 12:
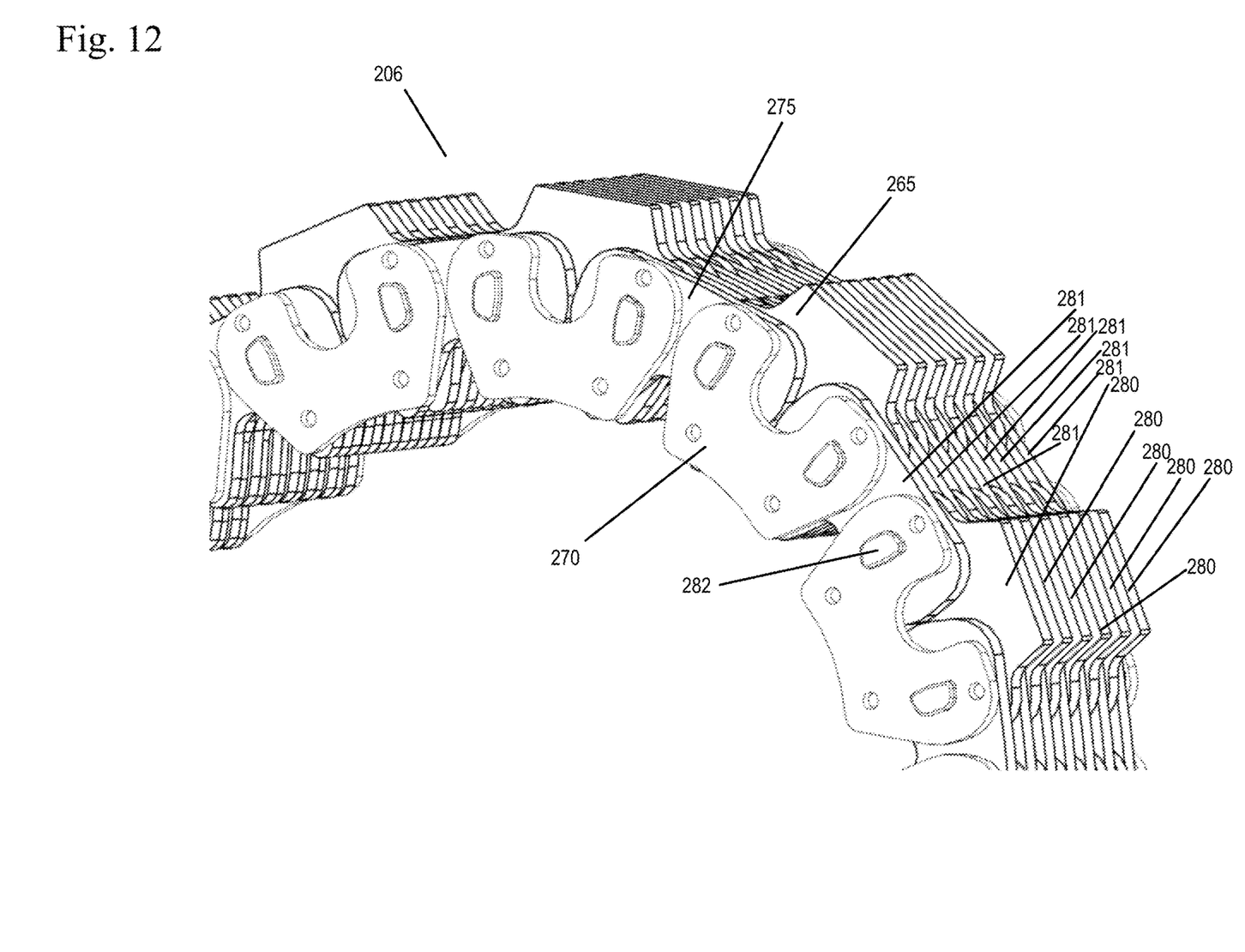
FIG. 12 shows a perspective view of the chain.

FIGS. 13-16 show the links that comprise the chain shown in FIG. 12. The chain 285 is constructed of alternating sets of first inside links with raised backs 265 and second inside links 275 interleaved in the lateral and longitudinal direction and pivotably connected by connecting pins 282 and guide plates 270 disposed on the outermost sides of the chain 285 for receiving and fixing the connecting pins 282. The chain 285 has a plurality of guide rows 280 that are formed of the guide plates 270 and the first inside links with raised backs 265 disposed at the same longitudinal position as the guide plates 270 and link rows 281 that are formed of only the second inside link plates 275 that are disposed between adjacent guide rows 280.

Figure 13:
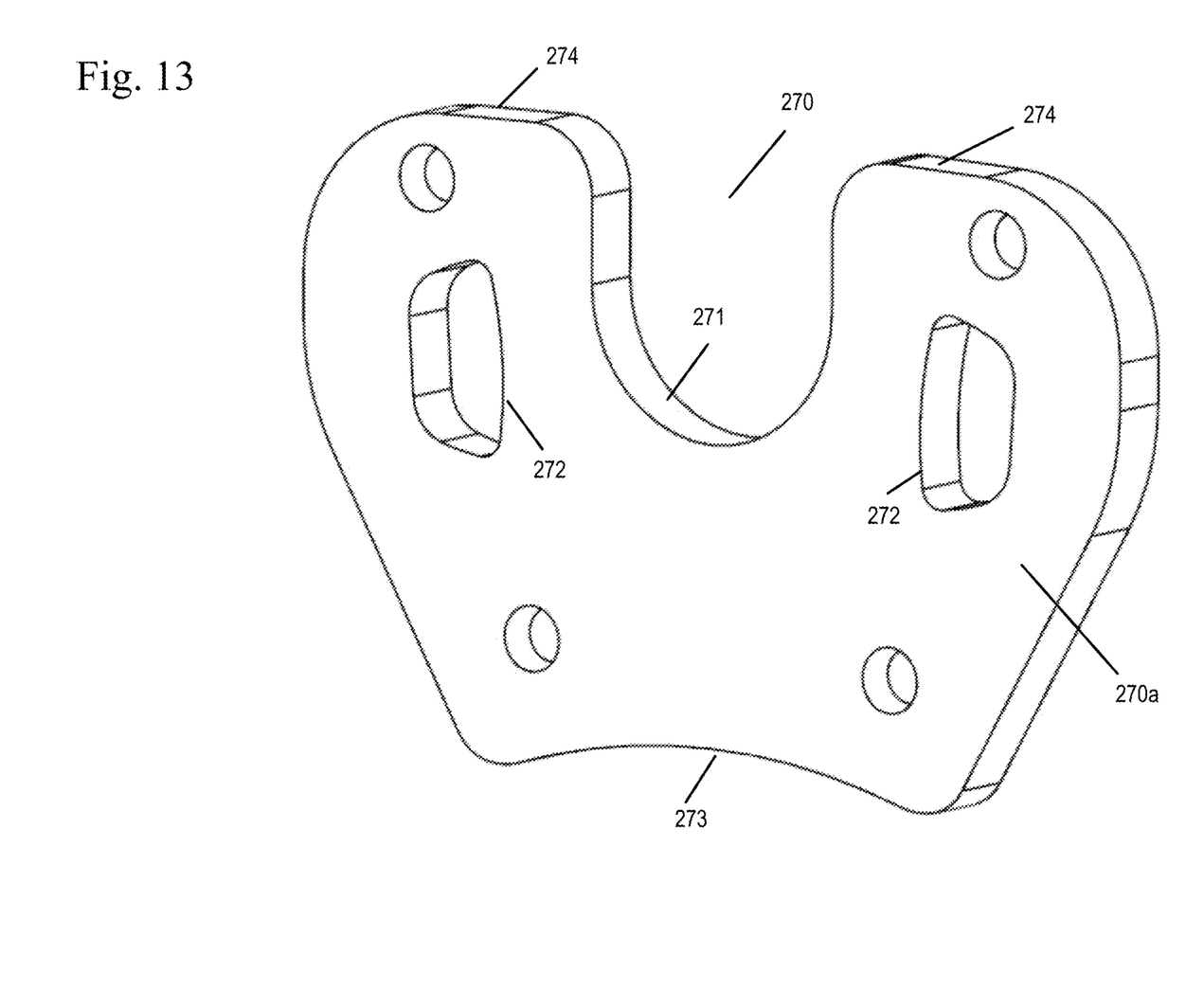
FIG. 13 shows an outside link.

Referring to FIG. 13, the outside guide links 270 include a body 270a having a crotch portion 271 defining and between a pair of toes 274. Opposite the pair of toes 274 is a concave back portion 273. The body 270a also defined pin apertures 272 in each of the toes of the pair of toes 274. The crotch portion 271 extends below the upper edge portion 272a of each of the pin apertures 272.

Figure 15:
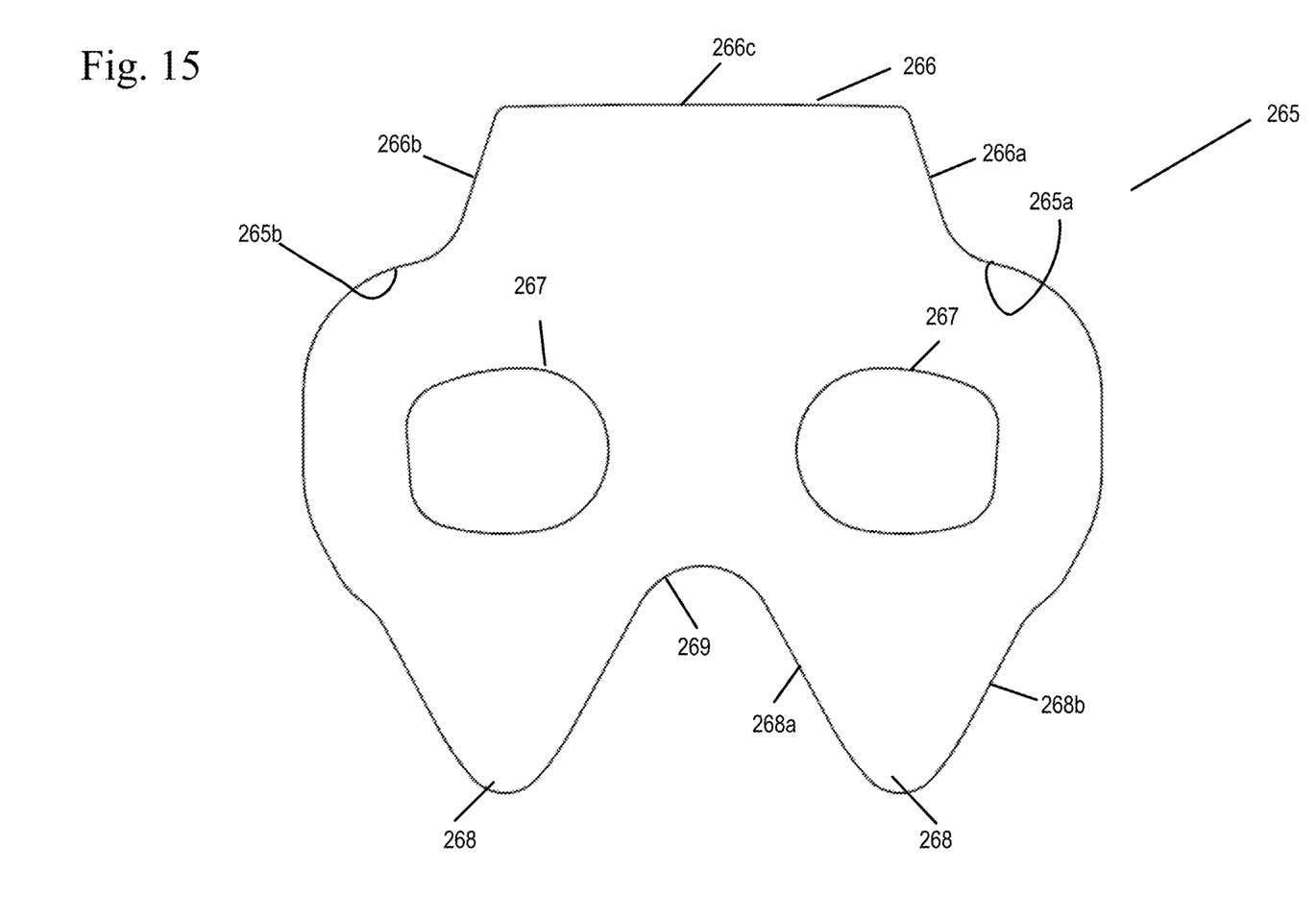
FIG. 15 shows a side view of a second inside link.
Figure 16:
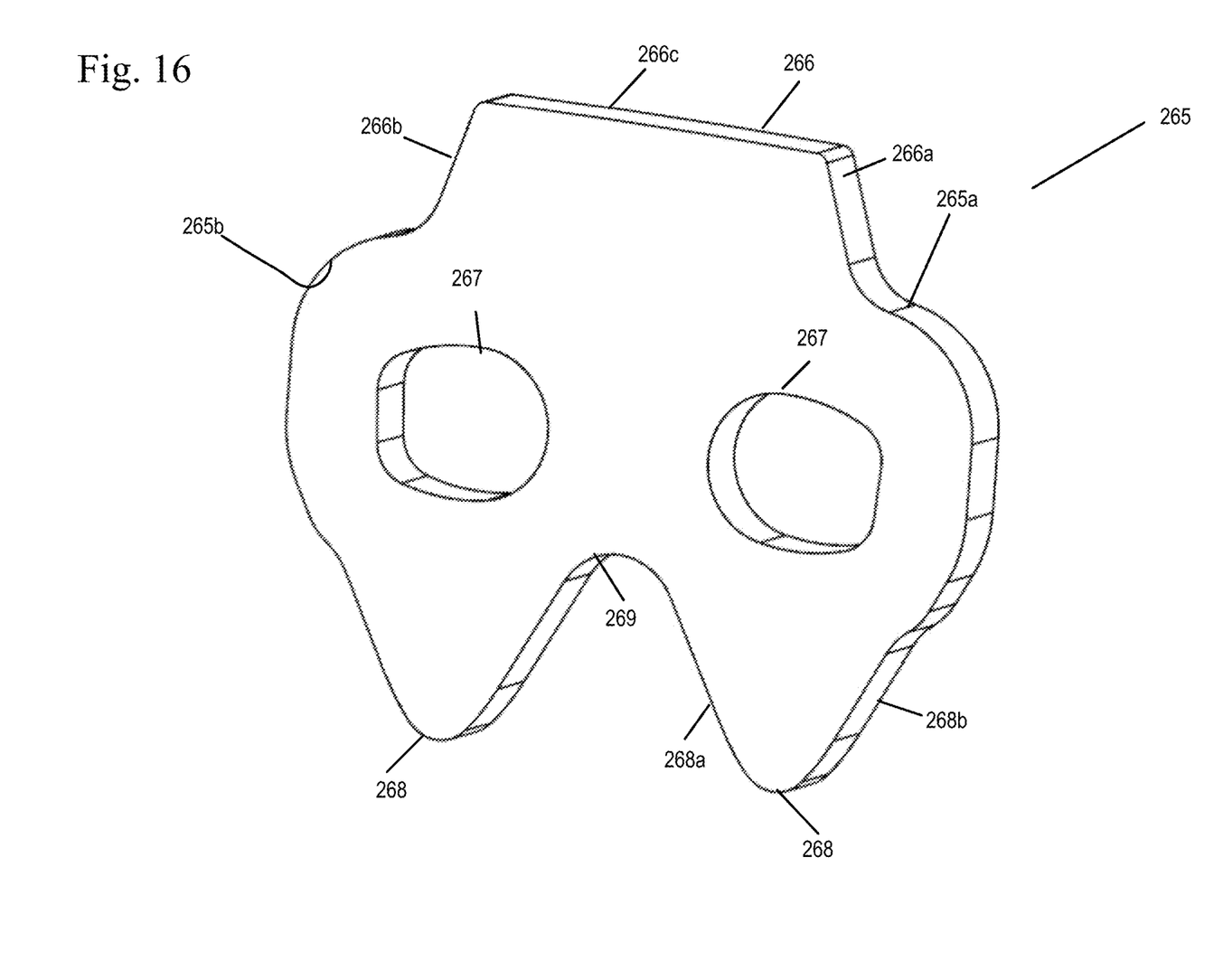
FIG. 16 shows a perspective view of the second inside link.

Referring to FIG. 15, the first inside links 265 include a body 265a having a crotch portion 269 defining and between a pair of toes 268 and a back portion 266. The body 265a further defines a pair apertures 267. The raised back portion 266 of the first inside links 265 is opposite at least the crotch portion 269 and at least part of the pair of apertures 267 and the pair of toes 268. The raised back portion 266 is preferably flat and extends laterally outwards from an edge 265b of the body 265 and has a first flank 266a, a second flank 266b and a flat surface 266c connecting the first flank 266a to the second flank 266b. Each toe of the pair of toes 268 has an outside flank 268b and an inside flank 268a.

Figure 14:
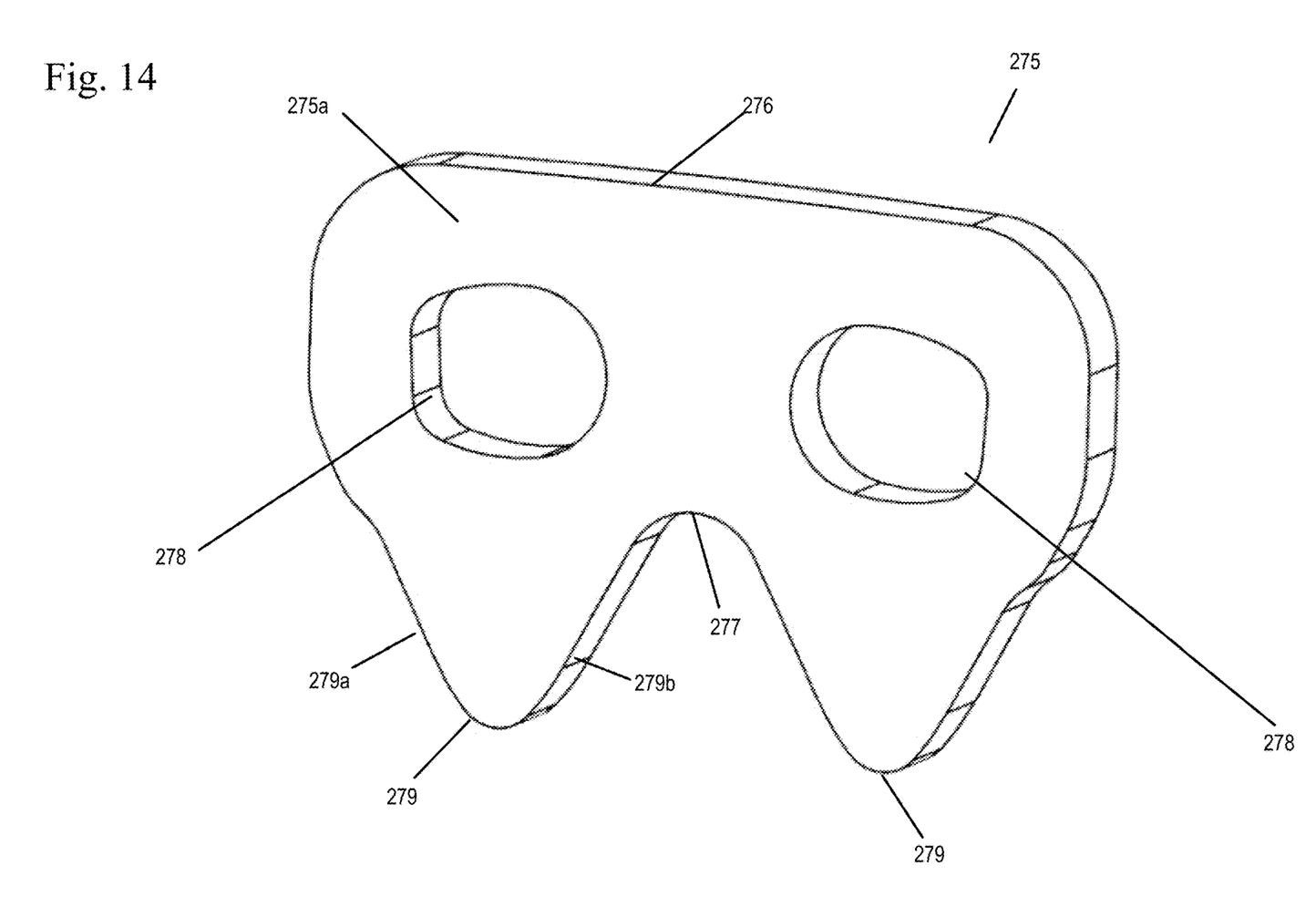
FIG. 14 shows a first inside link.

Referring to FIG. 14, the second inside links 275 include a body 275a having a crotch portion 277 defining and between a pair of toes 279 and a back portion 276. The body 275a further defines a pair apertures 278. The back portion 276 of the second inside links 275 is opposite the pair of apertures 278, the pair of toes 279 and the crotch portion 277. The back portion 276 is preferably flat. Each toe of the pair of toes 279 has an outside flank 279b and an inside flank 279a.

Either the inside flank 279a, 268a or outside flank 279b, 268b of the first inside link 275 and the second inside link 268 engage with a sprocket teeth 205, 203 of the sprockets of the final drive or primary drive.

While the inside links are shown as included a raised back portion, within the scope of the invention, the raised back portions could be located on the outside links of the chain.

Figure 6:
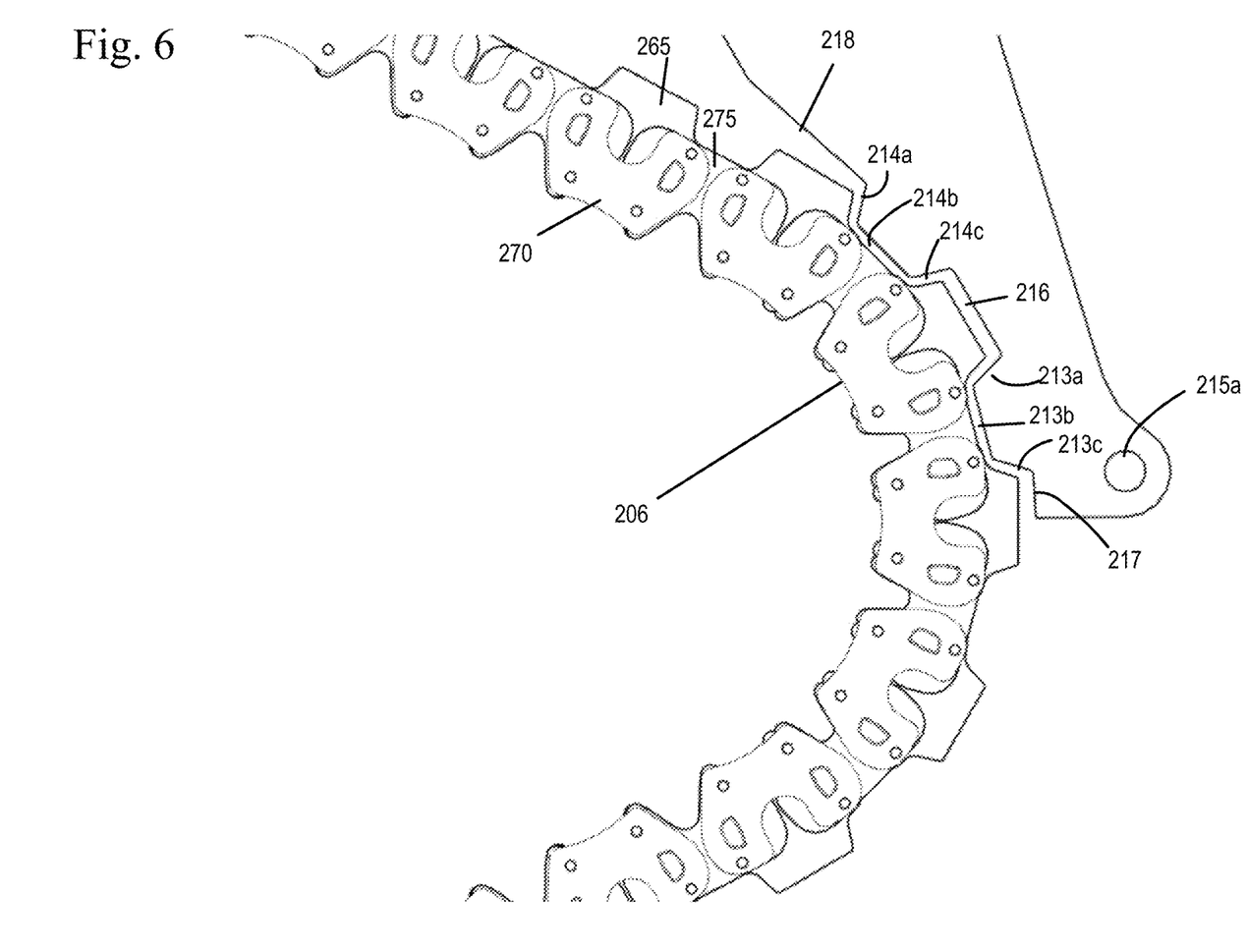
FIG. 6 shows a side view of the engagement of the parking pawl with a chain.
Figure 7:
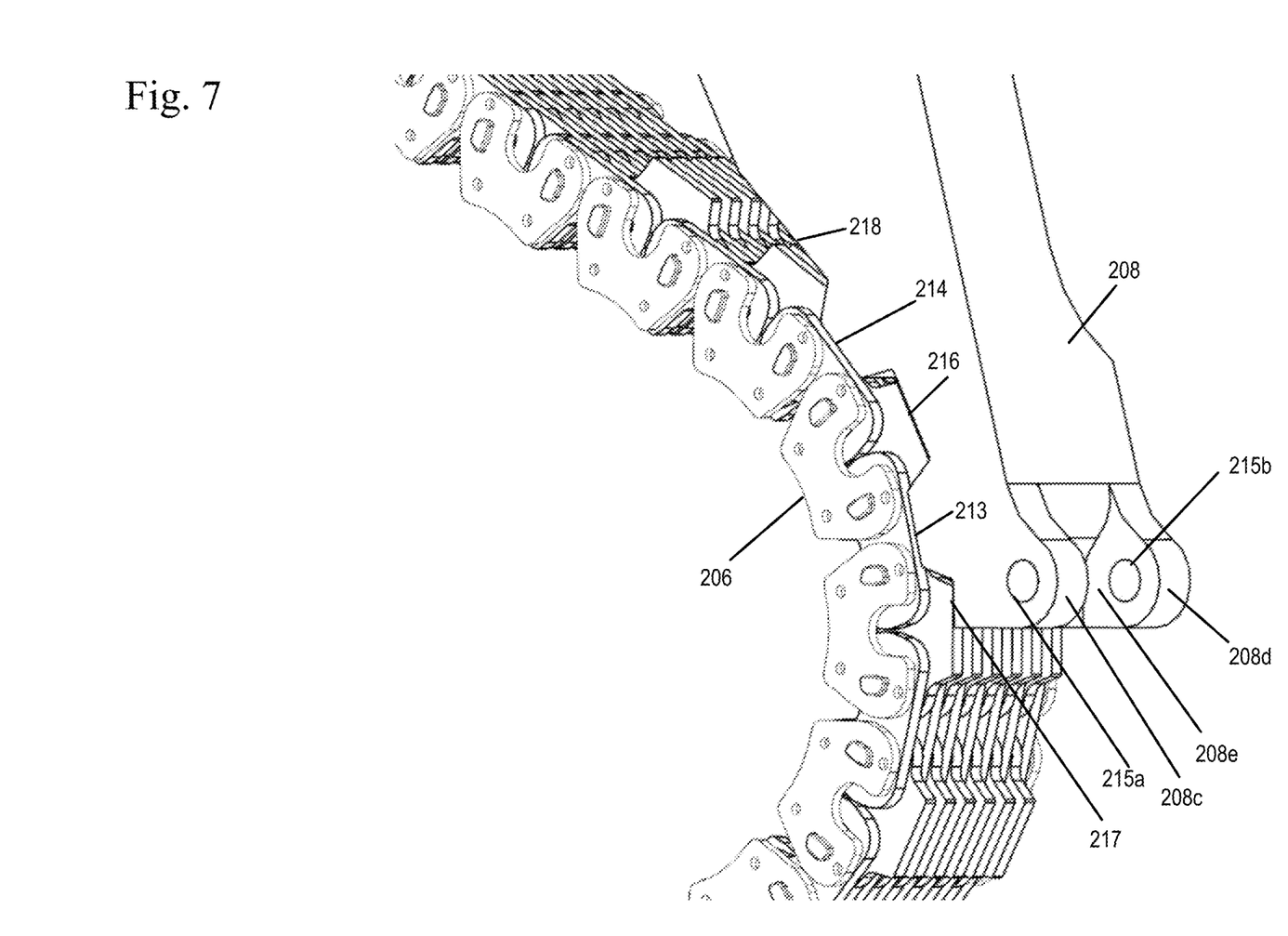
FIG. 7 shows a top view of the engagement of the parking pawl with the chain.
Figure 8:
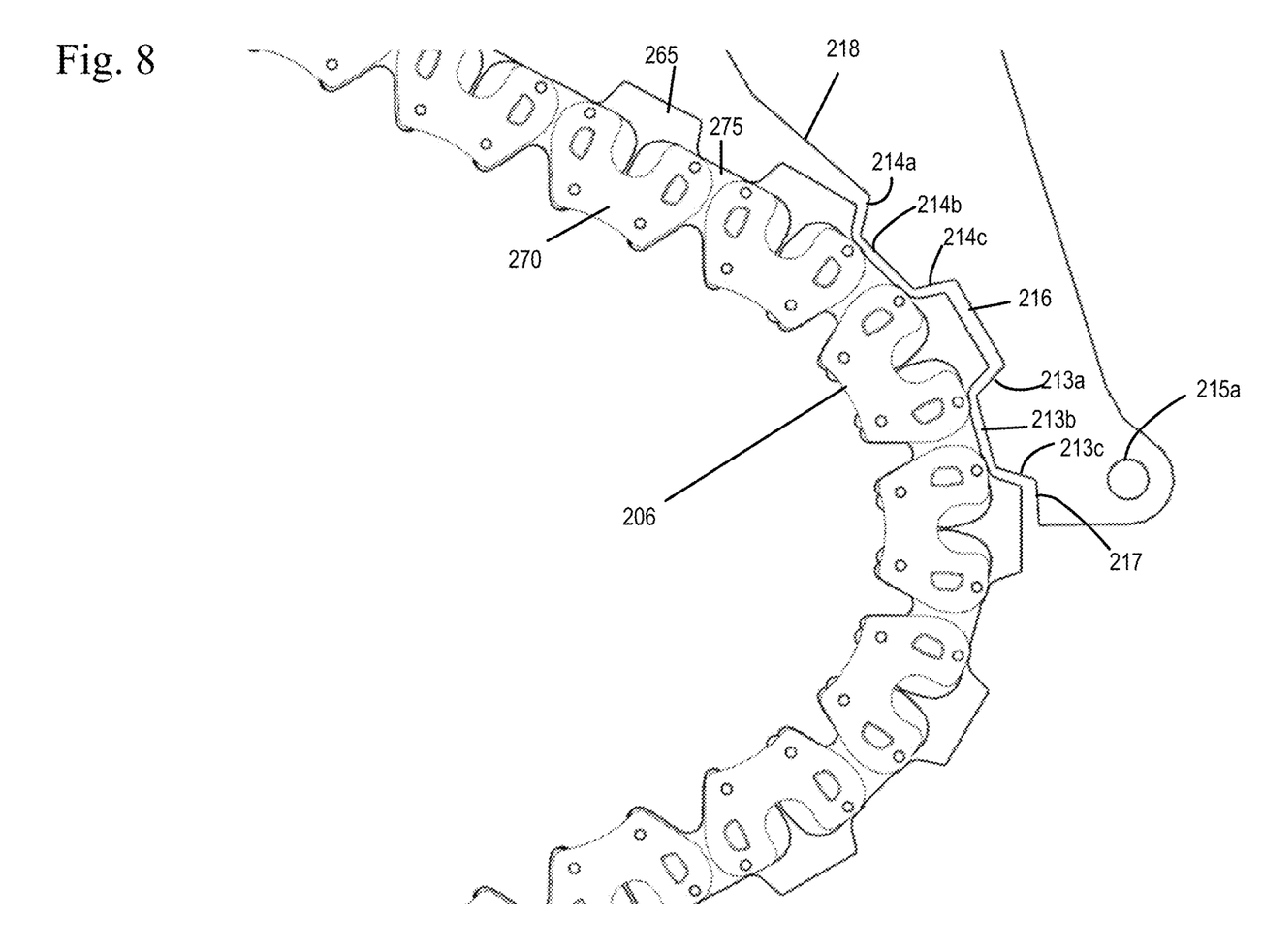
FIG. 8 shows another view of the engagement of the parking pawl with the chain.

FIGS. 6-8 show engagement of the parking pawl with the chain.

The parking pawl 208 is moveable between an engaged and a disengaged position. In the disengaged position, the bottom surface 220 of the parking pawl 208 is disengaged from the back portion 276 of the second inside links 278 and the raised back portion 266 of the first inside links 275, allowing the chain 206 and sprockets 202, 204 to continue to rotate, thus allowing the drive wheels (not shown) connected to the output shaft 102 via the output shaft sprocket 204 to turn.

In the engaged position, the bottom surface 220 of the parking pawl 208 is engaged with chain 206, such that the first flank 214a of the first tooth 214 of the parking pawl 208 engages with the second flank 266a of a raised back portion 266 of the first inside link 278, the second recess 216 being aligned with the flat surface 266c of the raised back portion 266 of another first inside link 278, the first flank 213a of the second tooth 213 of the parking pawl 208 engaged with the second flank 266a of a raised back portion 266 of another first inside link 278 and the third recess 217 of the parking pawl 208 aligned with the flat surface 266c of a third first inside link. The tooth engagement surfaces 214b, 213b of the parking pawl 208 are parallel to the back portions 276 of the second inside links 275. Therefore, when the teeth 214, 213 of the parking pawl 208 engage the back portions 276 of the second inside links 275 of the chain 206 and the recesses 218, 216, 217 between the teeth 214, 213 of the parking pawl 208, the engagement of the teeth 214, 213 of the parking pawl 208 with the raised back portion 266 of the chain 206 prevent further rotation of the output sprocket 204 and the chain 206.

Figure 4:
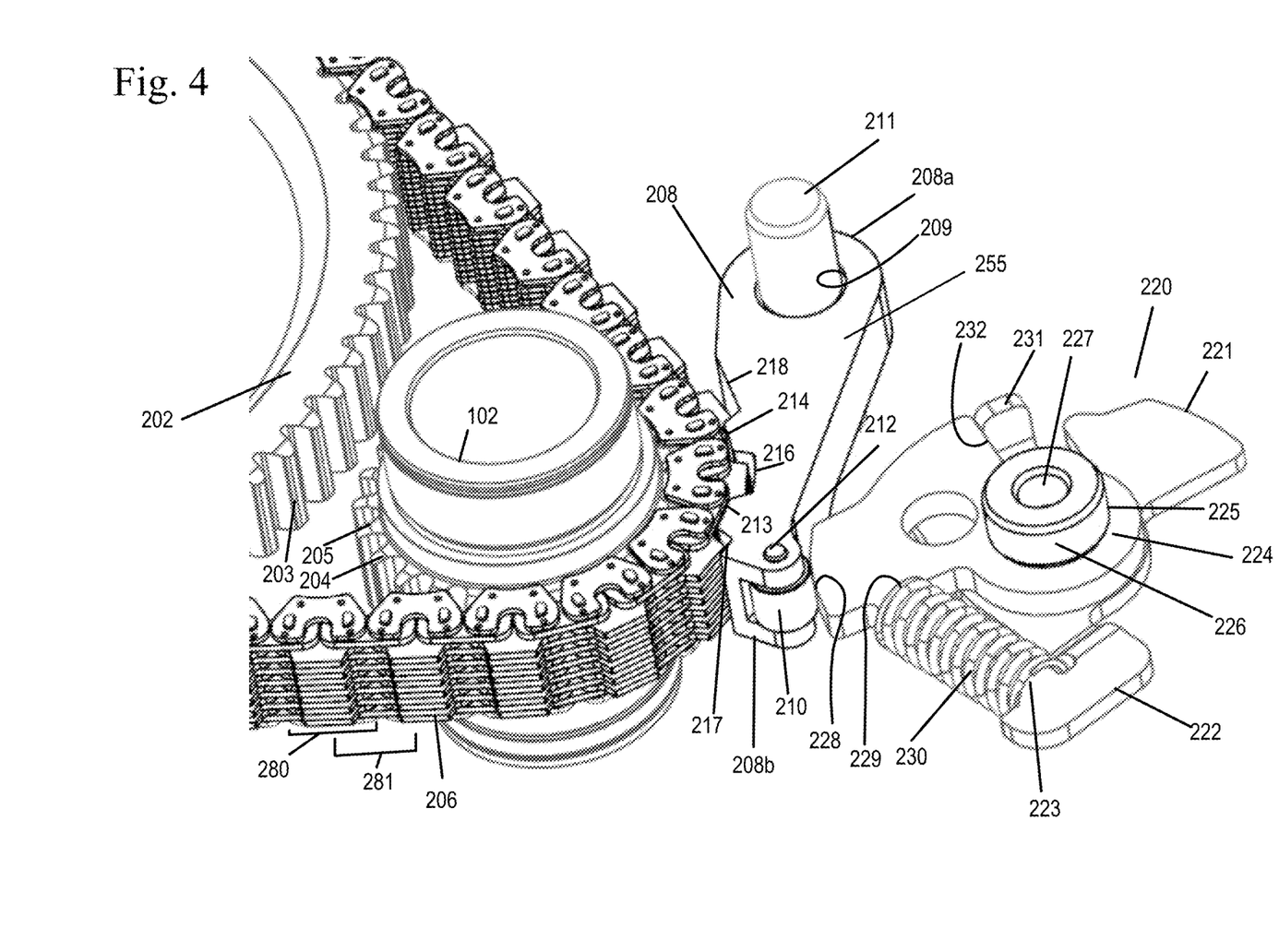
FIG. 4 shows a top view of the engagement of the parking pawl with a chain of the final drive or primary drive.
Figure 5:
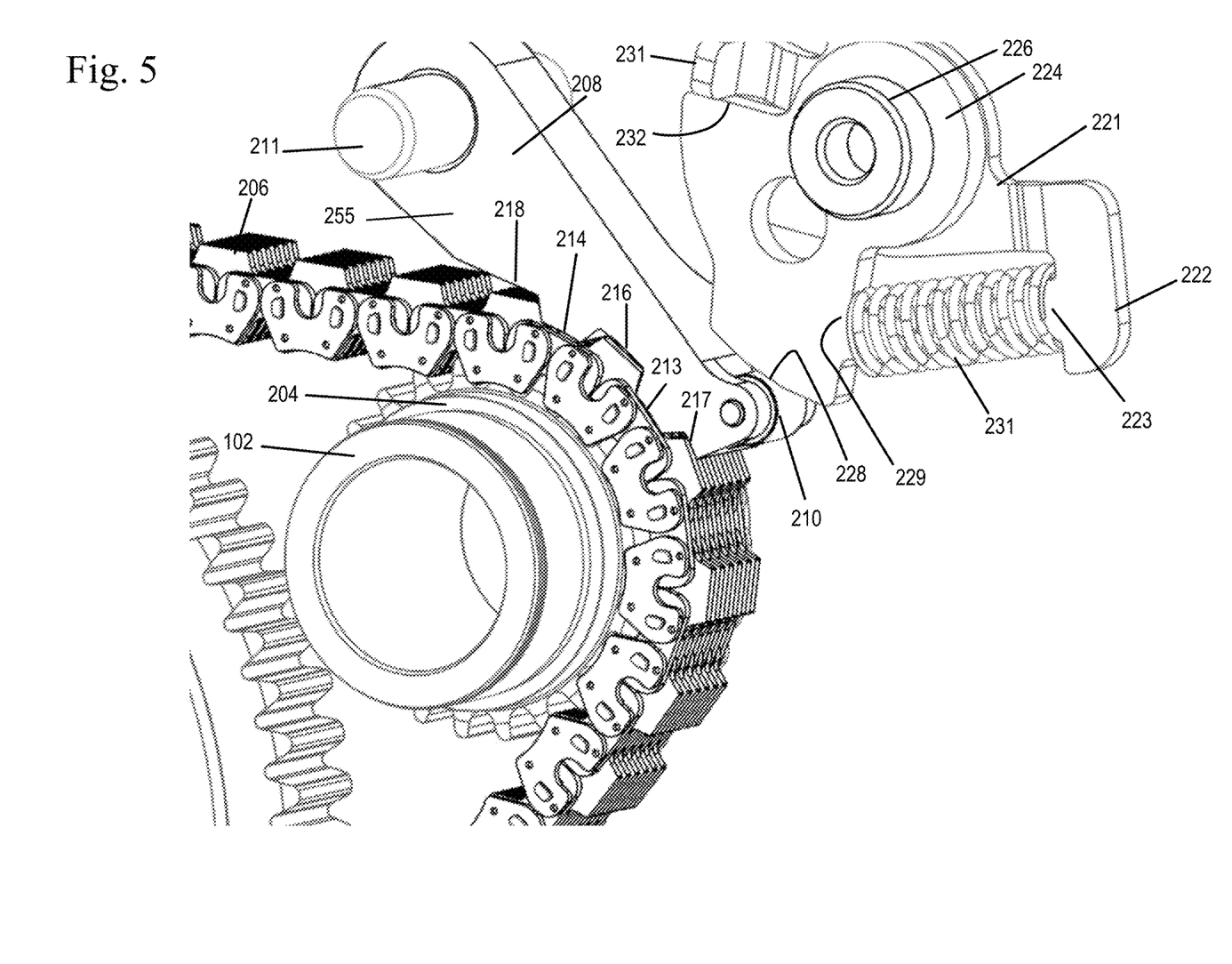
FIG. 5 shows a side view of the engagement of the parking pawl with a chain of the final drive or primary drive.

FIGS. 4-5 show the cam assembly 220 which urges the parking pawl 208 into the engaged position. The cam assembly 220 has a stationary lever plate 221 that defines a center bore, an arm 222 with an arm end portion 223, and a stop 231 which extends radially from the lever plate 221. Located adjacent to the lever plate 221 is a cam plate 224 with a bore 225 aligned with the center bore of the lever plate 221. The cam plate 224 additionally has a cam plate end portion 229 and a biasing surface 228 that contacts the roller 210 of the parking pawl 208. Opposite the biasing surface 228 is a stop surface 232, which can engage with the stop 231 of the lever plate 221. Between the cam plate end portion 229 of the cam plate 224 and the arm end portion 223 of the arm 222 of the lever plate 221 is a spring 230. A pin 227 is received by the bore of the lever plate 221 and the bore 225 of the cam plate 224 and is held in place by a bearing 226, allowing the cam plate 224 to rotate relative to the lever plate 221. Alternatively, the pin 227 can be fixed to the stationary lever plate 221. The cam plate 224 is rotated into engagement with the roller 210 of the parking pawl by either a mechanical linkage or an electric actuator, with a potential for a spring bias (not shown).

To disengage the parking pawl 208 from the chain 206, cam plate 224 is forced to rotate away from the stop 231 by the mechanical linkage or an electric actuator, with a potential for a spring bias (not shown). With the rotation of the cam plate 224 away from the stop 231, the biasing surface 228 is no longer in engagement with roller 210 of the parking pawl 208 and the teeth 213, 214 no longer engage with the raised back portion 266 of the chain 206.

It is noted that a cam or over-center device that maintains the engagement or disengagement of the cam plate 224 with the roller 210 may be used. The over-center device may be an over-center spring mechanism which mechanically holds the biasing surface 228 of the cam plate 224 in engagement with the roller 210 of the parking pawl 208 or disengagement relative to the bearing 226 acting as a pivot point. The over-center device may include a tension spring that is attached at one end to the fixed structure of the stationary lever plate 221 and the other end of the tension spring is attached to the cam plate 224.

Alternatively, two chains located on a given reduction set can allow two independent chains to be engaged with one parking mechanism, adding an additional level of redundancy that would still hold the vehicle stationary should an unlikely event of a chain breakage. For example, in battery electric vehicles transmissions, there are two ratio reductions used to reduce the electric motor speed to a lower speed appropriate for most road speeds. The parking feature of the present invention on the chain could be used in either ratio reduction inside the transmission depending on the packaging and location of the chain inside the transmission.

It is noted that the parking mechanism can be used on any chain layout, as long as the chain includes raised backs for the parking pawl to engage with.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A parking mechanism located on a final drive or primary drive of a vehicle to engage or disengage an output shaft connected to wheels of the vehicle, the parking mechanism comprising:

a first sprocket having sprocket teeth, the first sprocket connected to the output shaft for driving the wheels of the vehicle;

a second sprocket having sprocket teeth;

an endless loop chain in engagement with the sprocket teeth of the first sprocket and the sprocket teeth of the second sprocket, the endless loop chain comprising:

a first inside link comprising: a body having a back portion with a first flank, a second flank, and a flat surface; a pair of teeth connected by a crotch portion opposite the back portion; a pair of apertures between the pair of teeth and the back portion; wherein the back portion extends laterally from the body and is opposite at least the crotch portion, at least part of the pair of teeth and at least part of the apertures;

a second inside link comprising: a body having a back portion; a pair of teeth connected by a crotch portion opposite the back portion; a pair of apertures between the pair of teeth and the back portion; and wherein the first inside links and the second inside links are arranged in alternating interleaved rows in lateral and longitudinal directions and pivotably connected by connecting pins;

guide plates disposed on outermost sides of the endless loop chain for receiving and fixing the connecting pins;

a parking pawl pivotably moveable between an engaged position in which the parking pawl engages the laterally extending back portion of the first inside links of the endless loop chain and a disengaged position in which the parking pawl is disengaged from the laterally extending back portion of the first inside links of the endless loop chain, the parking pawl comprising:

a body having a first end, a second end, a top surface, and a bottom surface opposite the top surface;

a plurality of alternating teeth and recesses on the bottom surface between the first end and the second end; and a roller rotatably attached to the first end of the body; and a cam assembly to move the parking pawl between the engaged position and the disengaged position.

2. The parking mechanism of claim 1, wherein the first end of the parking pawl is bifurcated to receive the roller.

3. The parking mechanism of claim 1, wherein the cam assembly further comprises:

a stationary lever plate defining a central hole, an arm having a spring protrusion and a stop;

a rotatable cam plate defining a central hole, a spring protrusion, a biasing surface adapted to contact the roller of the parking pawl, and a stop surface adapted to contact the stop of the stationary lever plate;

a pivot pin received within the central hole of the stationary lever plate and the central hole of the rotatable cam plate, the pivot pin being fixed to the stationary lever plate; and a spring mounted between the spring protrusion of the stationary lever plate and the spring protrusion of the rotatable cam plate.

* * * * *